United States Patent
Bai et al.

(10) Patent No.: US 9,552,814 B2
(45) Date of Patent: Jan. 24, 2017

(54) VISUAL VOICE SEARCH

(71) Applicant: International Business Machines Corporation, Armonk, NY (US)

(72) Inventors: Kun Bai, Hartsdale, NY (US); Christian B. Kau, Los Altos, CA (US); Jerald T. Schoudt, Douglassville, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/709,586

(22) Filed: May 12, 2015

(65) Prior Publication Data

US 2016/0336012 A1 Nov. 17, 2016

(51) Int. Cl.
*G10L 15/26* (2006.01)
*G10L 15/04* (2013.01)

(52) U.S. Cl.
CPC ...................... *G10L 15/26* (2013.01)

(58) Field of Classification Search
CPC ...... G06F 17/20; G10L 13/02; G10L 15/1822; G10L 2015/225; G10L 15/183; G10L 15/19; G10L 15/197; G10L 15/26; H04M 3/493
USPC ................. 704/235, 251, E15.001, E15.043, 231,704/270.1, 275
See application file for complete search history.

(56) References Cited

U.S. PATENT DOCUMENTS 8,249,870 B2    8/2012  Roy et al.
8,380,040 B2    2/2013  Carter et al.
2004/0021765 A1   2/2004  Kubala et al.
2008/0242343 A1  10/2008  Koh et al.
2013/0066630 A1   3/2013  Roe
2013/0085931 A1   4/2013  Runyan
2014/0095158 A1*  4/2014  Vroom ................ G10L 15/26
                                                  704/235

FOREIGN PATENT DOCUMENTS

EP    0866397 B1    1/2003
EP    1586990 A2   10/2005
EP    1643722 A1    4/2006

OTHER PUBLICATIONS

IBM, "Interactive Visual Synthesis of Analytic Knowledge", IP.com, No. IPCOM/000187744D, Publication Date: Sep. 17, 2009, pp. 1-14.
Disclosed Anonymously, "Visualizing Multi-Dimensional Relevancy of Search Results for Spatial Datasets", IP.com, No. IPCOM/000222915D, Publication Date: Oct. 29, 2012, pp. 1-5.
IBM, "Method and System for Improved Search Relevance", IP.com, No. IPCOM/000186509D; Aug. 24, 2009, pp. 1-2.

(Continued)

*Primary Examiner* — Charlotte M Baker

(74) *Attorney, Agent, or Firm* — Michael A. Petrocelli

(57) ABSTRACT

A computer implemented method and system for initiating an action uses text converted from a user's speech. A user's speech is converted into text using an automatic speech recognition (ASR) system of a device. A first group of words is determined from the text meeting a first criteria. The text of the first group of words is displayed on a user interface of the device. A first action is initiated in response to the user's selection of a word in the first group. The results of the first action are presented using the user interface of the device.

18 Claims, 3 Drawing Sheets

(56) References Cited

OTHER PUBLICATIONS

Sabol et al., "Visualization Metaphors for Multi-Modal Meeting Data", http://www.iicm.tu-graz.ac.at/home/cguetl/publications/2007/sabol%20et%20al.%202007%20-%20wmsrm07.pdf, 2007, pp. 1-20.

Luz et al., "Interactive Visualization Techniques for Dynamic Speech Transcription, Correction and Training", CHINZ, Jul. 2, 2008, pp. 9-16.

Otsuka et al., "A Realtime Multimodal System for Analyzing Group Meetings by Combining Face Pose Tracking and Speaker Diarization", ICMI '08, Oct. 20-22, 2008, pp. 257-264.

Ziegler et al., "Generating Semantic Contexts from Spoken Conversation in Meetings", IUI '05, Jan. 9-12, 2005, pp. 290-292.

\* cited by examiner

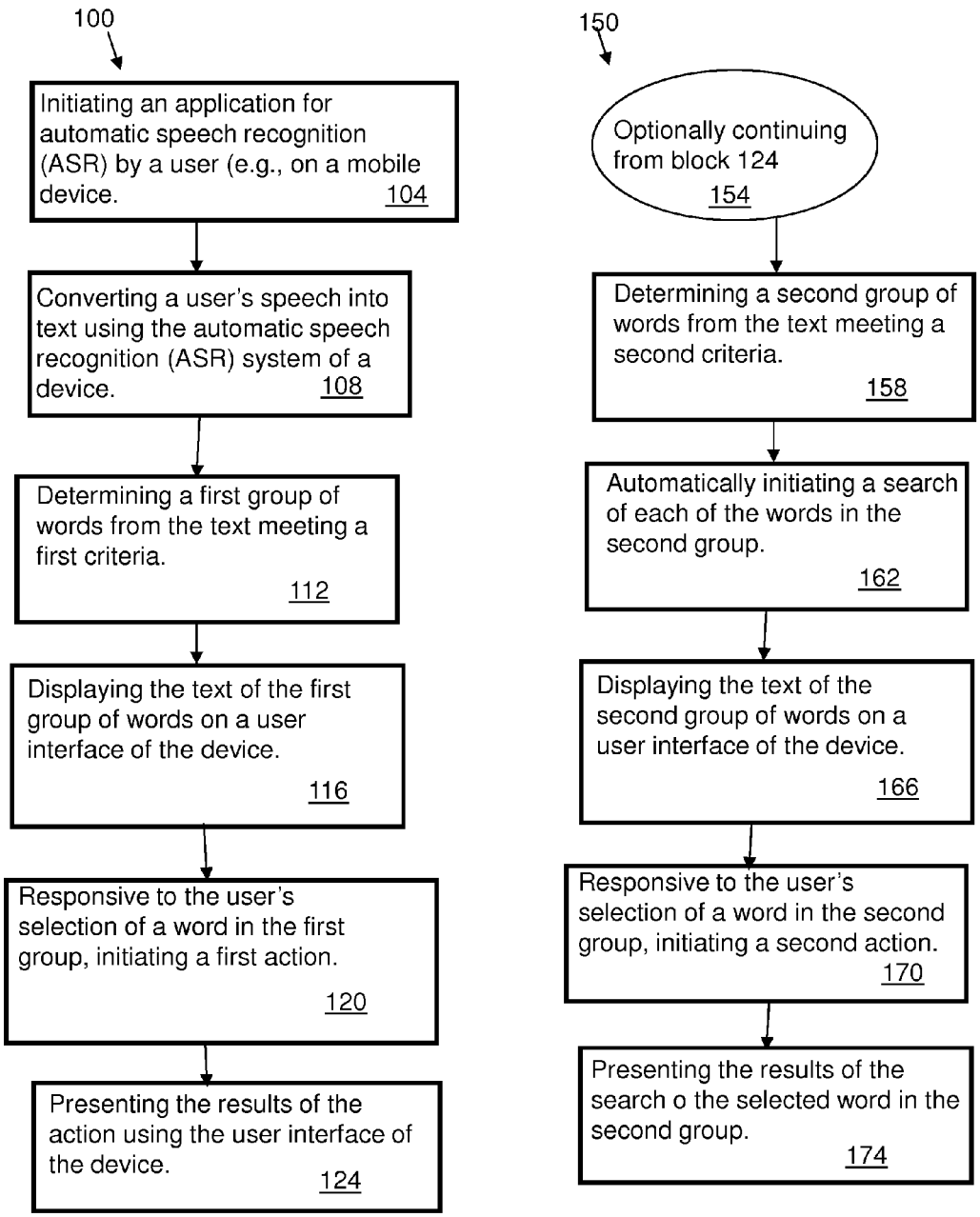

VISUAL VOICE SEARCH

BACKGROUND

The present disclosure relates to methods and systems having speech recognition. Computer devices or other devices, for example, hand held devices, can be a source of information for a user. Providing supplemental information to a user, can be beneficial, for example, when a person is having a conversation with others, or in a business meeting. In some situations (e.g., business meeting, group conversation, etc.) it would be desirable to have access to supplemental information without having to manually enter search terms and search a data store or online service.

Typically, a user can use a computer or a mobile device to search for information pertinent to a conversation or meeting the user is simultaneously involved in. In one example, a database or online service or a search service can be used by a user who can input text to provide one or more search terms using a tactile input method (e.g., a keyboard). This method can be distracting to the user, as well as other participants in a conversation, and requires significant time for the user to input search terms and receive information.

Non-tactile input methods, e.g., voice-based input methods, can be distracting to the user and others by requiring the user to speak while participating in a meeting or a conversation with others. Other types of audio-focused tools (e.g., meeting recorders that can be used to create transcripts) do not provide realtime access during the users conversation or meeting with others.

SUMMARY

According to an aspect of the present invention, a computer implemented method for initiating an action uses text converted from a user's speech. A user's speech is converted into text using an automatic speech recognition (ASR) system of a device. A first group of words is determined from the text meeting a first criteria. The text of the first group of words is displayed on a user interface of the device. A first action is initiated in response to the user's selection of a word in the first group. The results of the first action are presented using the user interface of the device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is a flow chart illustrating a method for initiating an action from text from a user's converted speech based on FIG. 1 according to an embodiment of the disclosure;

FIG. 3 is a flow chart illustrating a method continuing from the flow chart shown in FIG. 2, according to an embodiment of the disclosure.

DETAILED DESCRIPTION

Figure 1:
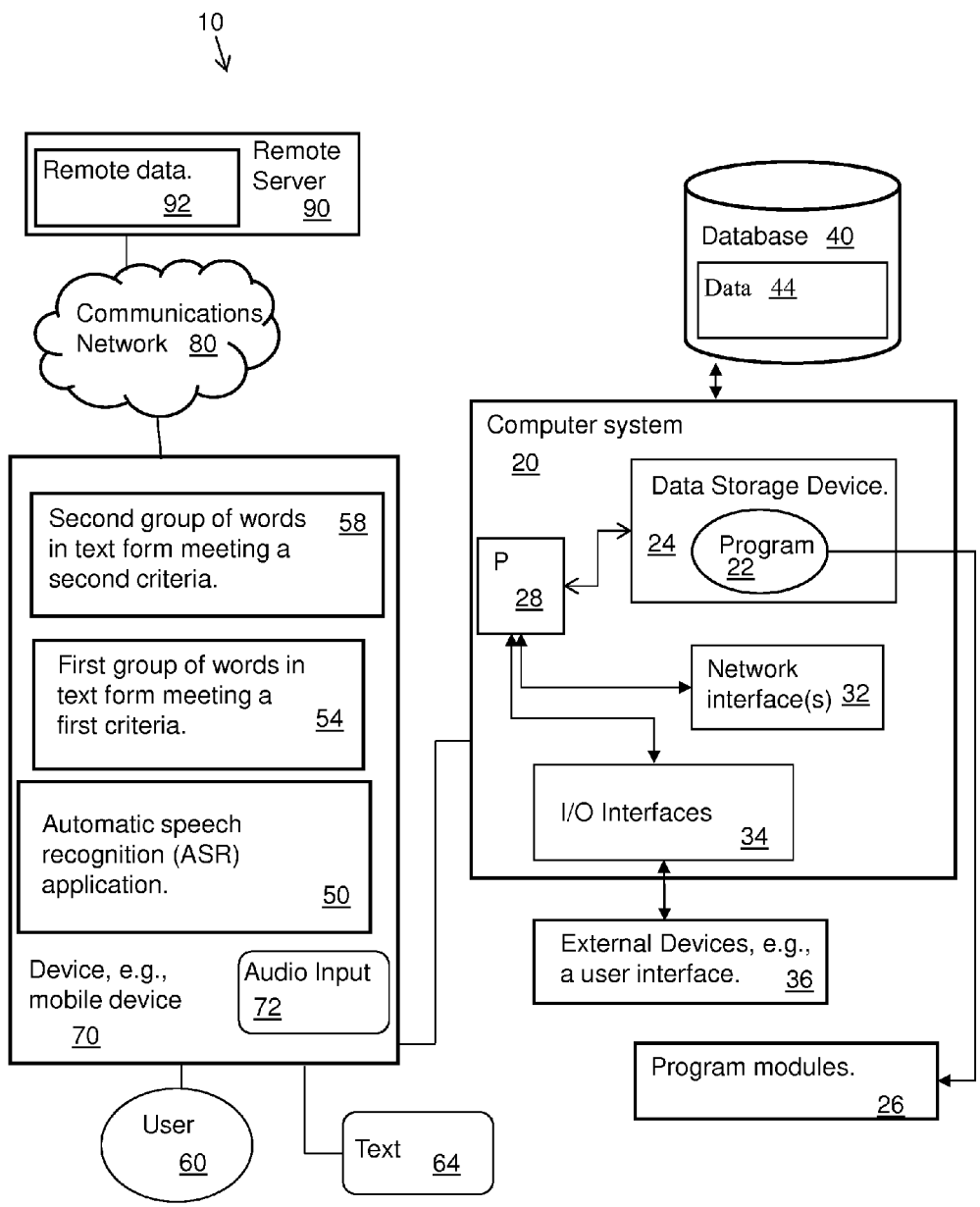
FIG. 1 is a schematic block diagram illustrating an overview of a system and methodology for initiating an action from text from a user's converted speech according to an embodiment of the disclosure.
Figure 4:
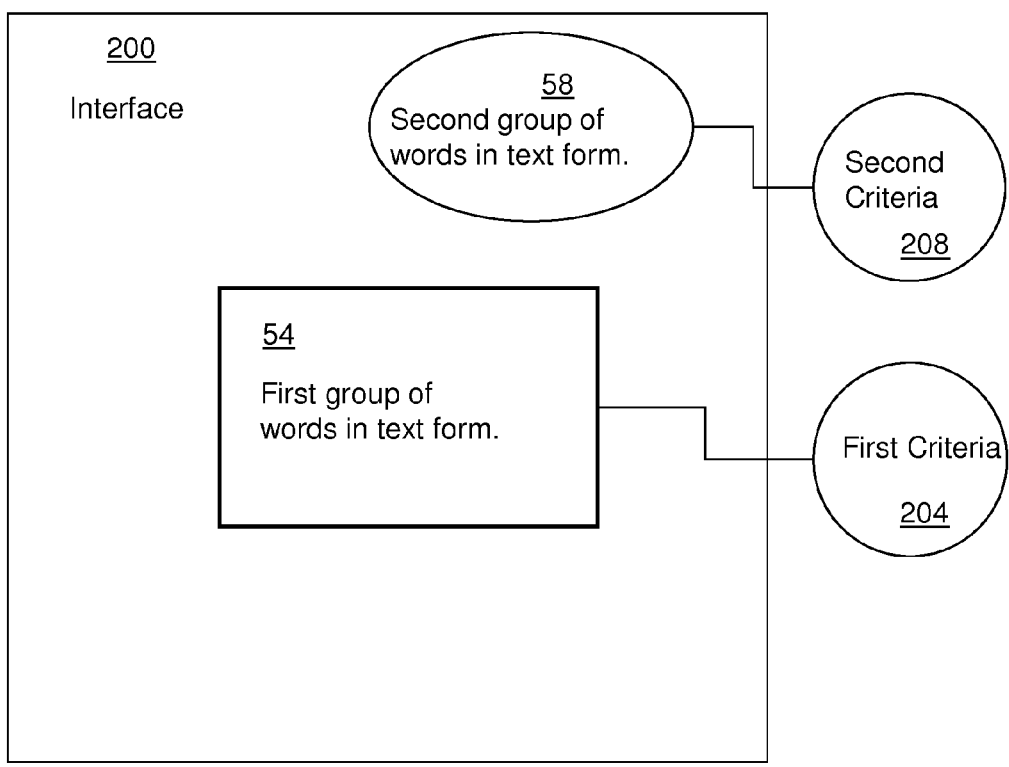
FIG. 4 is a schematic block diagram illustrating an interface of a device according to an embodiment of the disclosure.

Referring to FIGS. 1, 2, and 4, a system 10 and method 100 according to an embodiment of the disclosure, initiate an action using text converted from speech including audio of one or more users. An application 50 for automatic speech recognition (ASR) can be initiated by a user 60 (block 104) on a device or a computer, for example on a mobile device 70. For example, the ASR can translate the spoken language of the user into text 64. A user's speech can be converted into text using an automatic speech recognition (ASR) system of a device, as in block 108. It is understood that the device includes an audio input mechanism for receiving speech, generically referred to as audio input 72. The speech for translation can also be from a plurality of participants in a conversation which may or may not include the user.

A first group of words 54 from the text 64 are determined by meeting a first criteria 204 (FIG. 4), as in block 112. In one example, the first criteria can include that the words be one or more of: a noun, a verb, a place, a date, or a name of a person or place, i.e., a proper noun or proper name.

The text of the first group of words 54 is displayed on a user interface 200 (also referred to as the display) (FIG. 4) of the device 70, as in block 116. The first group of words is selected from the converted text of the user's speech using the ASR 50, using the first criteria 204. The text 64 is generically shown in FIG. 1. According to the embodiment of the present disclosure, the text 64 is displayed as the first group of words from the text 64 as described above.

Responsive to the user's selection of a word in the first group, an action is initiated, as in block 120. In one example, the action can be a word search using a search engine or web browser, obtaining search results corresponding to the selected word. The results of the action are presented using the user interface 200 of the device 70, as in block 124.

Alternatively, the action can include one or more of: conducting a search, creating an email, creating a text message, or creating a calendar entry, or displaying a profile of a person in a contact list of the user. The search can include searching a database, or searching the World Wide Web using a browser. The device 70 can communicate with a communications network 80 to search the World Wide Web accessing remote information/data 92 on a remote server 90 (FIG. 1), or a remote database. The action can also include creating an email using an email application, or creating a text message. A calendar entry can be created by accessing a user's calendar in an email application. Another action can include searching for a person's name in a contact list of the user, for example, where the contact list is part of a meeting notice (or a meeting attendee list), or a telephone contact list.

Referring to FIG. 3, in another embodiment according to the present disclosure, a supplemental method 150 continues from block 124 (of method 100 shown in FIG. 2), as in block 154. Block 158 includes determining a second group of words 58 from the text using a second criteria 208 (FIG. 4). A search is automatically initiated of each of the words in the second group (as in block 162) and the results are stored, for example in a data storage device. The second group of words 58 are displayed on the user interface 200, separate from the first group of words 54, as in block 166. In one example, the second group of words 58 are displayed off-center on the display 200 from a centrally displayed first group of words 54.

Responsive to the user selecting one of the words in the second group of words 58 (as in block 170), an action is initiated; in this embodiment, the stored search results are displayed on the user interface 200, as in block 174.

The second criteria 208 can include determining a frequency of the words used in the text. For example, the second criteria can include adding a word that is repeated in the text to the second group of words. For example, the repetition of a word more than twice or more than three times can meet the second criteria.

The second criteria can also include the words from the text which are proper names (name of a person), or proper nouns (the name of a place). The automatic search of each of the words in the second group and the presentation of the search results after the user selection, is an embodiment of a second action. The second action can also include creating and sending an email or message to a person.

In one example, the first criteria for a first group of words from the text can include words that are proper names. The first action can include creating an email. As discussed above, the second criteria for a second group of words from the text can be based on the repetition of the word. The second action can include a search of the World Wide Web and presenting the search results on a device interface. The user can select one or more words from the visual representation of words, i.e., in the first group of words. Alternatively, the user can view one of the automatically generated search result in the second area of the display by selecting one of the words in the second group of words.

In another embodiment according to the present disclosure, instead of determining a first or second group of words, a question in the speech can be determined. A criteria for determining a question can include detecting intonation of the user's speech. For example, the user's voice rising at the end of the sentence. Natural language processing can also be used to interpret the text to determine a question or a command.

In another embodiment according to the present disclosure, speech of a group of participants of a conversation is converted into group text using the automatic speech recognition (ASR) system of a device such as a mobile device. The first group of words is determined from the words in the group text which meet the first criteria.

In the present disclosure includes a system where voice input is converted into text. The text can be displayed to the user in a visual representation that can be recognized at a glance. The system can perform one or more searches for words. A user can perform a search on any word by selecting one or more search terms from the presented text and search a database or online service. Thereby, the present disclosure requires minimal interaction from the user and is minimally distractive to other participants of the conversation.

The method and system of the present disclosure can be an application for a mobile device, a desktop computer, or be available as an online service.

The users 60 may use a device, for instance the mobile device 70 to access an ASR application 50. The mobile device 70 is one embodiment of a device having a computer, other devices may include, for example, a Personal Data Assistant (PDA), a cell phone, or a notebook, or the like. The device can be configured to send and receive electronic communications. The computer 20 is a generic representation of a computer which may be embodied in a device such as a hand held device, or can also represent a server for providing the method of the present disclosure as a service which can be accessible using the Internet or a network.

The method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

The method 100 can be part of an automatic speech recognition application or an add-on application working with an automatic speech recognition application. The method can be run locally on a device such as the mobile device, or can be run a service, for instance, on a remote server 90 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one embodiment, the method and system according to the present disclosure records the audio of a conversation between a plurality of users and generates a visual representation of the words (or word visualization) used by participants in the conversation, e.g., a word cloud in a first area of a display of a device. Voice to text recognition (ASR) can be used to achieve the conversion of the user's speech. The most frequently used words can be selected and a search performed for these words ahead of time. The results of the word searches can be displayed away from the center of the word visualization to provide additional context on devices where screen size allows, for example, a second area of the display. On smaller devices, the searches can be cached for more rapid responses to the user when a word is selected by the user.

A user can also initiate a search of a word in the word visualization by selecting the word, or for example, using an affordance, e.g. a button on the user interface for initiating a search. The search can include a database or an online service. The search results can then be displayed on a device for a user.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for initiating an action using text converted from a user's speech, comprising:
    converting a user's speech into text using an automatic speech recognition (ASR) system of a device having a computer;
    determining a first group of words from the text meeting a first criteria;
    displaying the text of the first group of words on a user interface of the device;
    responsive to the user's selection of a word in the first group, initiating a first action;
    presenting the results of the first action using the user interface of the device;
    converting speech of a group of participants of a conversation into group text using the automatic speech recognition (ASR) system of the device, wherein the user is or is not included in the group of participants; and
    determining the first group of words from the group text meeting the first criteria.

2. The method of claim 1, wherein the first action includes obtaining search results corresponding to the selected word, and the method further comprising:
    presenting the search result using the user interface of the device.

3. The method of claim 1, wherein the first action includes one or more of: conducting a search, creating an email, creating a text message, or creating a calendar entry, or displaying a profile of a person in a contact list of the user.

4. The method of claim 1, wherein the first criteria includes the first group of words being one or more of: a noun, a verb, a place, a date, or a name of a person or place.

5. The method of claim 1, further comprising:
    determining a second group of words from the text using a second criteria;
    displaying the text of the second group of words on the user interface of the device;
    responsive to the user selecting one of the words in the second group of words, initiating a second action; and
    presenting the results of the second action using the user interface of the device.

6. The method of claim 5, further comprising:
    automatically initiating a search of the second group of words and storing the results; and
    responsive to the user selecting one of the words in the second group of words, displaying the stored search results.

7. The method of claim 5, wherein the second criteria includes determining a frequency of the words used in the text.

8. The method of claim 5, wherein the second criteria includes one or more of: a frequency of the word used in the text; the word being a proper name; or the word being a proper noun.

9. The method of claim 1, wherein the determining a first group of words meeting a first criteria includes detecting proper names and adding the proper names to the first group of words.

10. The method of claim 1, further comprising:
    detecting a question in the user's speech by analyzing intonation of the user's speech.

11. A computer system for initiating an action using text converted from a user's speech, the computer system comprising:
    one or more computer processors, one or more computer-readable storage media, and program instructions stored on one or more of the computer-readable storage media for execution by at least one of the one or more processors, the program instructions, comprising:
    converting a user's speech into text using an automatic speech recognition (ASR) system of a device;
    determining a first group of words from the text meeting a first criteria;
    displaying the text of the first group of words on a user interface of the device;
    responsive to the user's selection of a word in the first group, initiating a first action;
    presenting the results of the first action using the user interface of the device;
    converting speech of a group of participants of a conversation into group text using the automatic speech recognition (ASR) system of a device, wherein the user is or is not included in the group of participants; and
    determining the first group of words from the group text meeting the first criteria.

12. The computer system of claim 11, further comprising:
    determining a second group of words from the text using a second criteria;
    displaying the text of the second group of words on the user interface of the device;
    responsive to the user selecting one of the words in the second group of words, initiating a second action; and
    presenting the results of the second action using the user interface of the device.

13. The computer system of claim 12, further comprising:
    automatically initiating a search of the second group of words and storing the results; and
    responsive to the user selecting one of the words in the second group of words, displaying the stored search results.

14. A computer program product for initiating an action using text converted from a user's speech, the computer program product comprising a computer readable storage medium having program instructions embodied therewith, wherein the computer readable storage medium is not a transitory signal per se, the program instructions executable by a computer to cause the computer to perform a method, comprising:
    converting, using the computer, a user's speech into text using an automatic speech recognition (ASR) system of a device;
    determining, using the computer, a first group of words from the text meeting a first criteria;
    displaying, using the computer, the text of the first group of words on a user interface of the device;
    responsive to the user's selection of a word in the first group, initiating a first action using the computer;
    presenting the results of the first action using the user interface of the device;
    converting speech of a group of participants of a conversation into group text using the automatic speech recognition (ASR) system of a device, wherein the user is or is not included in the group of participants; and determining the first group of words from the group text meeting the first criteria.

15. The computer program product of claim 14, wherein the first action includes one or more of: conducting a search, creating an email, creating a text message, or creating a calendar entry, or displaying a profile of a person in a contact list of the user.

16. The computer program product of claim 14, further comprising:

determining a second group of words from the text using a second criteria;

displaying the text of the second group of words on the user interface of the device;

responsive to the user selecting one of the words in the second group of words, initiating a second action; and presenting the results of the second action using the user interface of the device.

17. The computer program product of claim 16, further comprising:

automatically initiating a search of the second group of words and storing the results; and responsive to the user selecting one of the words in the second group of words, displaying the stored search results.

18. The computer program product of claim 14, wherein the first action includes obtaining search results corresponding to the selected word, and the method further comprising:

presenting the search result using the user interface of the device.

* * * * *